US012464298B2

(12) United States Patent
Wu et al.

(10) Patent No.: US 12,464,298 B2
(45) Date of Patent: Nov. 4, 2025

(54) ASSISTIVE LISTENING SYSTEM

(71) Applicant: DIGIBIONIC LIFESTYLE CO., LTD., New Taipei (TW)

(72) Inventors: Chih-Hsien Wu, New Taipei (TW); Yu-Hsun Lin, New Taipei (TW); Fu Jie Tey, New Taipei (TW)

(73) Assignee: DIGIBIONIC LIFESTYLE CO., LTD, New Taipei (TW)

( * ) Notice: Subject to any disclaimer, the term of this patent is extended or adjusted under 35 U.S.C. 154(b) by 217 days.

(21) Appl. No.: 18/378,423

(22) Filed: Oct. 10, 2023

(65) Prior Publication Data

US 2024/0214751 A1 Jun. 27, 2024

Related U.S. Application Data

(60) Provisional application No. 63/435,459, filed on Dec. 27, 2022.

(51) Int. Cl.
*H04R 25/00* (2006.01)

(52) U.S. Cl.
CPC ......... *H04R 25/505* (2013.01); *H04R 25/554* (2013.01); *H04R 25/558* (2013.01); *H04R 2225/41* (2013.01); *H04R 2225/55* (2013.01)

(58) Field of Classification Search
CPC .. H04R 25/505; H04R 25/554; H04R 25/558; H04R 2225/41; H04R 2225/55; H04R 1/10; H04R 1/1083; H04R 25/00
See application file for complete search history.

(56) References Cited

U.S. PATENT DOCUMENTS

2014/0050329 A1* 2/2014 Chiang ................. H04R 29/00 381/60

* cited by examiner

*Primary Examiner* — Tuan D Nguyen

(74) *Attorney, Agent, or Firm* — Birch, Stewart, Kolasch & Birch, LLP

(57) ABSTRACT

Disclosed is an assistive listening system, which is designed to provide a prescription-adjusted signal to an audio output device to compensate for hearing impairment. The system includes a sound sensor, a digital signal processor, and a wireless transceiver. The sound sensor used to detect ambient background noise to generate a sensing signal. The digital signal processor receives the sensing signal to generate a prescription-adjusted signal. The wireless transceiver transmits the prescription-adjusted signal to the audio output device. When the ambient background noise changes, the sound sensor can generate the sensing signal in real-time, and the digital signal processor can generate and transmit the prescription-adjusted signal to the audio output device. Therefore, the user can enjoy optimized sound quality conveniently without manually adjusting the audio output device.

9 Claims, 3 Drawing Sheets

ASSISTIVE LISTENING SYSTEM

CROSS REFERENCE TO RELATED APPLICATIONS

This non-provisional application claims the benefit under 35 U.S.C. § 119 (e) to U.S. Provisional Application No. 63/435,459, filed on Dec. 27, 2022, which is hereby expressly incorporated by reference into the present application.

BACKGROUND OF THE INVENTION

Field of the Invention

The invention relates to an assistive listening system, in particular, to an assistive listening system designed to provide a prescription-adjusted signal to compensate for hearing impairment.

Description of the Prior Art

According to the World Hearing Report released by the World Health Organization on Mar. 2, 2021, one in five people in the world has hearing impairment. In the next 30 years, the number of people with hearing impairment may increase by more than 1.5 times, from 1.6 billion people in 2019 to 2.5 billion people, of which more than 700 million people may experience moderate or severe hearing impairment. Studies also show that people with hearing impairment may have difficulty in talking to friends and family or responding to warning sounds.

Therefore, the number of people who are willing to face the problem of hearing impairment and are willing to receive medical treatment and wear assistive listening devices is increasing year by year, such as wearing a hearing aid. Existing assistive listening devices provide noise reduction function, which can reduce and filter background noise of environment, so as to help users to talk to family and friends more easily, and to respond to warning sounds.

However, the existing noise reduction method is to change the listening environment mode of the assistive listening device by manually adjusting the application program in the smart phone connected to the signal of the assistive listening device. However, the convenience of use is insufficient; when the background noise of the environment changes, the user must often manually adjust the listening environment mode through the application.

Besides, the existing noise reduction method can also use the digital signal processor (DSP) in the assistive listening device to calculate the signal to offset the background noise of the environment, and then adjust the noise reduction by itself. However, due to the limited power of the assistive listening device, the digital signal processor will consume the power of the assistive listening device during operation. If a low-power DSP is used to improve battery life, the performance of the assistive listening device in avoiding the interference from the background noise of the environment is unsatisfactory due to the low computing power of the low-power DSP. It is difficult to combine the computing power of a digital signal processor with the battery life of an assistive listening device. Existing assistive listening devices often choose to sacrifice performance in terms of avoiding the interference from the background noise of the environment for battery life.

In addition, when a user wearing an assistive listening device enters a public environment, such as an airport, a station, etc., it is also difficult for him to hear public messages or warnings on the radio. Since the broadcasted public information is often distorted by air conduction, and the background noise of the environment in the space will also reduce the clarity of the broadcasted public information, so that the broadcasted public messages or warnings cannot be heard clearly by users wearing the assistive listening devices.

Thus, there is a need in the market for a product that can more conveniently change the listening mode of an assistive listening device and can better prevent the background noise of the environment from interfering with the assistive listening device.

SUMMARY OF THE INVENTION

The invention is to provide a product that can more conveniently change the listening mode of an assistive listening device and can better prevent the background noise of the environment from interfering with the assistive listening device.

An assistive listening system, which is designed to provide a prescription-adjusted signal to an audio output device for hearing impairment compensation, comprises: a sound sensor used to detect ambient background noise to generate a sensing signal; a digital signal processor in signal connection with the sound sensor to receive the sensing signal and generate a prescription-adjusted signal based on the sensing signal; and a wireless transceiver in signal connection with the digital signal processor, the wireless transceiver used to transmit the prescription-adjusted signal to the audio output device.

The effect of the invention is that when the ambient background noise changes, the sound sensor may generate the sensing signal in real-time, and the digital signal processor of the assistive listening system is capable of generating the prescription-adjusted signal and transmitting it to the audio output device of a user. Therefore, the user may more conveniently change the listening mode of the assistive listening device without manually adjusting the audio output device, so as to enjoy optimized sound quality and better listening experience. Further, the assistive listening system may use the high-end digital signal processor for computing without affecting the battery life of the audio output device; therefore, the ambient background noise may be better prevented from interfering with the audio output device, so the objective of the invention may be achieved.

DESCRIPTION OF THE PREFERRED EMBODIMENTS

The aforementioned and other technical contents, features, and effects of the invention will be clearly presented in the following detailed description of preferred embodiments with reference to the drawings.

Figure 1:
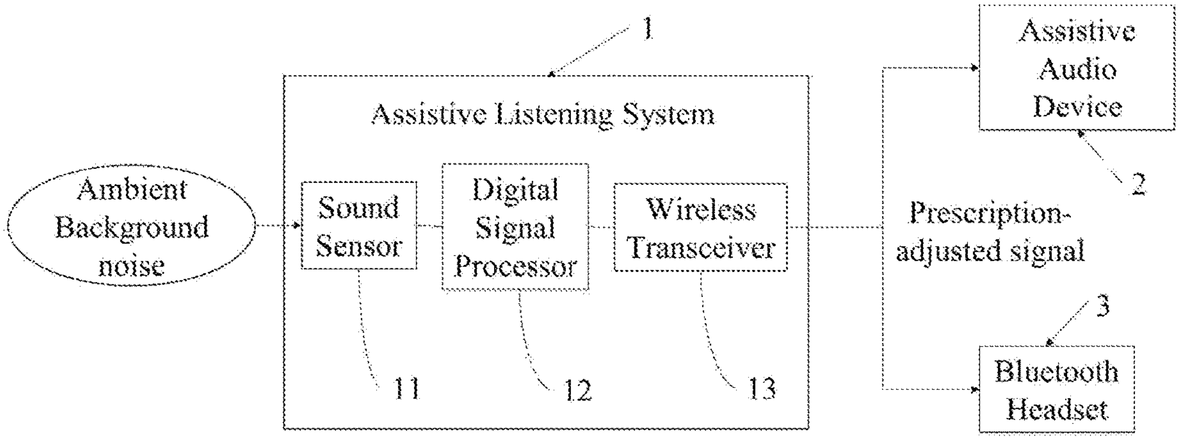
FIG. 1 is a structure diagram of an assistive listening system, an assistive audio device, and a Bluetooth headset according to the invention.

With reference to FIG. 1, an assistive listening system 1 of the invention provides a prescription-adjusted signal to an audio output device to compensate for hearing impairment; the audio output device includes an assistive audio device 2 or a Bluetooth headset 3, which is not limited in actual implementation; the assistive listening system 1 includes a sound sensor 11, a digital signal processor 12, and a wireless transceiver 13; the sound sensor 11 is used to detect the background noise of the environment, i.e., ambient background noise, to generate a sensing signal; the sound sensor 11 generates the sensing signal by using the audio feature extraction method of Mel Frequency Cepstral Coefficients (MFCC) to pre-process the audio first. The pre-processing will remove silent segments, that is, to remove meaningless audio, which may be performed by using the following formula:

$$E=\sqrt{\frac{1}{N}\sum\nolimits_{n=1}^{N}x(n)^2}\,;$$

wherein E represents the energy of the audio, N represents the length of the audio frame, and x(n) is the audio sample; in actual application, a certain threshold will be set; if E is higher than 1, then as long as the calculated E is less than 1, it will be excluded in the pre-processing to avoid meaningless calculations.

Then, the rest of the audio is subjected to framing and windowing, wherein the framing is to cut the audio into short time frames, and the windowing is to use the window function to reduce the problem of spectral leakage, which causes the content of the actual audio to not be displayed correctly. The formula for the window function is as follows:

$$w(n)=\frac{1}{2}\left(1-\cos\left(\frac{2\pi n}{N-1}\right)\right);$$

w(n) is the value of the window function at the nth sample, N is the window length (i.e., the length of the frame), and the value range of n is usually between 0 and N−1.

After the pre-processing is completed, discrete Fourier transform will be performed on each frame to convert the signal in the time domain into the frequency domain for subsequent analysis. The formula of the discrete Fourier transform is as follows:

$$x(k)=\sum\nolimits_{n=0}^{N-1}e^{-i\frac{2\pi}{N}kn}*\hat{x}(n);$$

k is an index in the frequency domain, N is the frame length, and n is the time domain signal of the frame.

The next step is to filter with the Mel-Frequency Filter Bank, which is mainly used to simulate the frequency perception mechanism of the human ear to sound. When the Mel-Frequency Filter Bank is applied, the spectral signal is calculated with the frequency response of each Mel-Frequency Filter Bank for the dot product. In this way, the energy of the frequency band corresponding to each Mel-Frequency Filter Bank may be obtained. The spectral signal is mapped to discrete frequency bands on the Mel scale, which better mimic the perceptual characteristics of the human car. This frequency representation is more suitable for feature extraction and pattern recognition tasks of speech and audio signals, and its formula is as follows:

$$H_m(k)=\begin{cases}0, k<f(m-1)\\ \dfrac{k-f(m-1)}{f(m)-f(m-1)}, f(m-1)\le k\le f(m)\\ \dfrac{f(m+1)-k}{f(m+1)-f(m)}, f(m)\le k\le f(m+1)\\ 0, k>f(m+1)\end{cases};$$

wherein f(m−1) is the center frequency of the (m−1)th filter, f(m) is the center frequency of the mth filter, f(m+1) is the center frequency of the (m+1)th filter, and k is the index of the frequency.

Finally, a discrete cosine transform is performed to convert the signal into the cepstrum domain, which is a method that may better represent the feature of the sound signal. By performing logarithmic operation and cepstrum transformation on the spectral signal, the cepstrum domain extracts the spectral envelope information of the sound signal. In the cepstrum domain, the spectral envelope is represented as the feature of the sound signal, which provides the overall shape and contour of the sound signal. This representation is very useful in speech processing and speech recognition because it can capture important speech features in speech, such as the position and intensity of formats, which play a key role in speech recognition. The discrete cosine transform formula for it is as follows:

$$x(k)=\sum\nolimits_{n=0}^{N-1}x(n)\cos\frac{\pi}{N}\left(k+\frac{1}{2}\right)$$

x(n) is the input sample sequence, and k is the index of the discrete cosine transform and generally ranges from 0 to N−1.

The digital signal processor 12 is in signal connection with the sound sensor 11 to receive the sensing signal and generate a prescription-adjusted signal according to the sensing signal. The wireless transceiver 13 is in signal connection with the digital signal processor 12, and the wireless transceiver 13 is used to transmit the prescription-adjusted signal to the audio output device.

Specifically, when the background noise of the environment changes, the sound sensor 11 may generate the sensing signal in real-time, and the digital signal processor 12 of the assistive listening system 1 is capable of generating the prescription-adjusted signal and transmitting it to the audio output device of a user 4. Therefore, the user 4 may more conveniently change the listening mode of the audio output device without manually adjusting the audio output device, so as to enjoy optimized sound quality and better listening experience. In addition, the assistive listening system 1 has marginal computing capability, and can perform autonomous computing through the digital signal processor 12, so the generation of the prescription-adjusted signal does not depend on the audio output device, thereby increasing its battery life.

Figure 2:
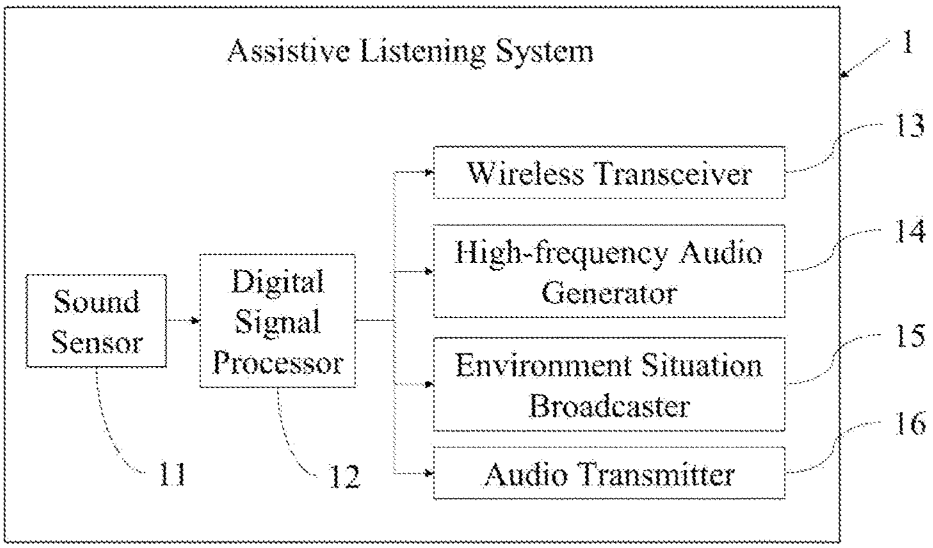
FIG. 2 is another block diagram of the assistive listening system according to the invention.

With reference to FIG. 2, in some embodiments, the assistive listening system 1 further includes at least one of a high-frequency audio generator 14, an environment situation broadcaster 15 or an audio broadcaster 16.

It is worth mentioning that the assistive listening system 1 may be an IoT bridge (network bridge) or a gateway. The assistive listening system 1 may be carried by the user 4 or installed in a public environment, such as a living room, a car, a restaurant, a transportation center, a hospital, a shopping mall, and the like. The assistive audio device 2 worn by the user 4 may be a hearing aid with Bluetooth function, and the user 4 may also wear the Bluetooth headset 3. Through the prescription-adjusted signal sent by the assistive listening system 1, the user 4 may enjoy clearer broadcast public information.

The sound sensor 11 may be a microphone, but is not limited thereto, and may also be other sound collecting elements.

Figure 3:
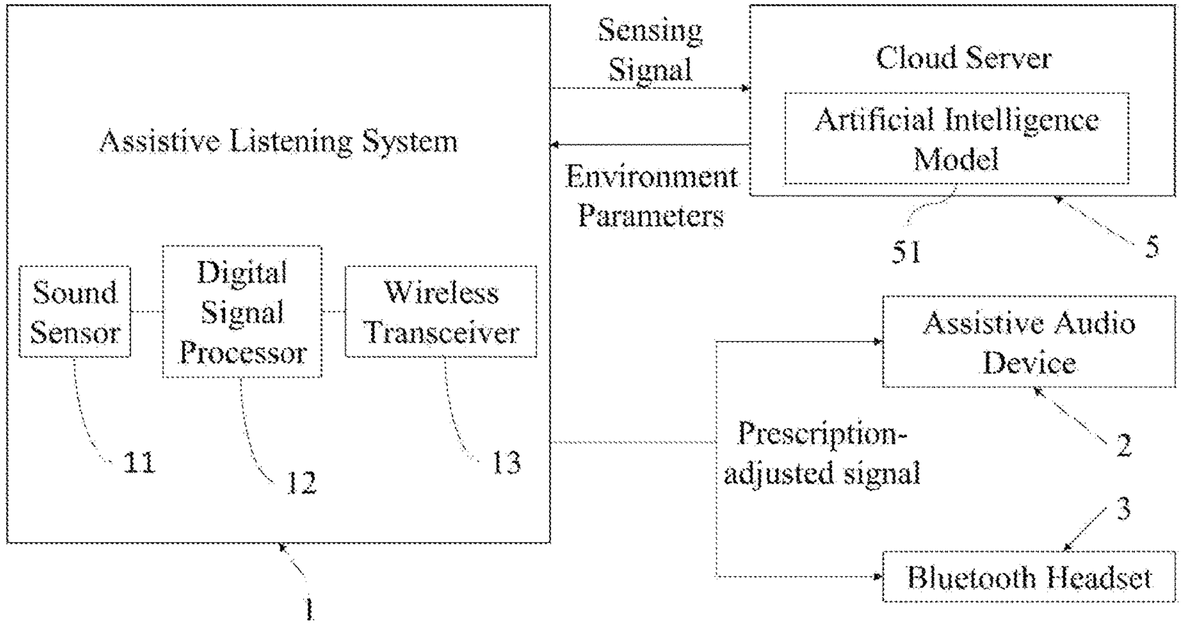
FIG. 3 is a structure diagram of the assistive listening system, a cloud server, the assistive audio device, and the Bluetooth headset according to the invention.

The digital signal processor 12 not only has marginal computing capability for generating different prescription-adjusted signals, but also can generate different prescription-adjusted signals through the cloud server. With reference to FIG. 3, in some embodiments, the wireless transceiver 13 may be in signal connection with the sound sensor 11 and a cloud server 5, and the cloud server 5 is configured with an artificial intelligence model 51; the wireless transceiver 13 receives and transmits the sensing signal to the cloud server 5, and the artificial intelligence model 51 generates prescription-reinforced parameters after computation based on the sensing signal; the prescription-reinforced parameters determine which frequencies need to be reinforced or weakened according to the environment, and the digital signal processor will generate the most suitable prescription-adjusted signal for the environment according to the prescription-reinforced parameters. For example, in case of a crisis, the signal processor may adjust the alarm frequency (853 Hz to 960 Hz), increase the decibel of the alarm and limit the upper limit of reinforcement according to the prescription-adjusted signal generated by the prescription-reinforced parameters, so that the audio output device may receive the alarm sound more easily while the prescription-adjusted signal avoiding hearing damage caused by excessive reinforcement. On the other hand, if in a quiet environment, such as a coffee shop, the noise frequency (250 Hz frequency band and 500 Hz frequency band) may be reduced, and the human voice frequency may be strengthened from 1600 Hz to 2500 Hz, so that the wearer of the audio output device may communicate at a lower volume. That is, after the wireless transceiver 13 receives the prescription-reinforced parameters, the digital signal processor 12 generates the most suitable prescription-adjusted signal accordingly, and transmits it to the audio output device through the wireless transceiver 13, so that by adjusting the prescription-adjusted signal in real-time, the user 4 may have a clearer listening experience.

On the other hand, the assistive listening system 1 also transmits the sensing signal based on the background noise of the environment to the cloud server 5 for big data collection, and then utilizes the artificial intelligence model 51 to calculate or compare the background noise of the environment received from various public environments, so as to be able to continuously learn and update the relevant data of the background noise of the environment in different public environments; further, the cloud server 5 outputs environment parameters, which are based on the relevant data, to the assistive listening system 1 to generate the prescription-adjusted signal to enhance the hearing aid effect of the audio output device.

In some embodiments, the wireless transceiver 13 includes a Bluetooth component, a Wi-Fi component, or a Long Term Evolution (LTE) component. The wireless transceiver 13 may transmit the prescription-adjusted signal to the audio output device through the radio signal in Low Energy (LE).

Figure 4:
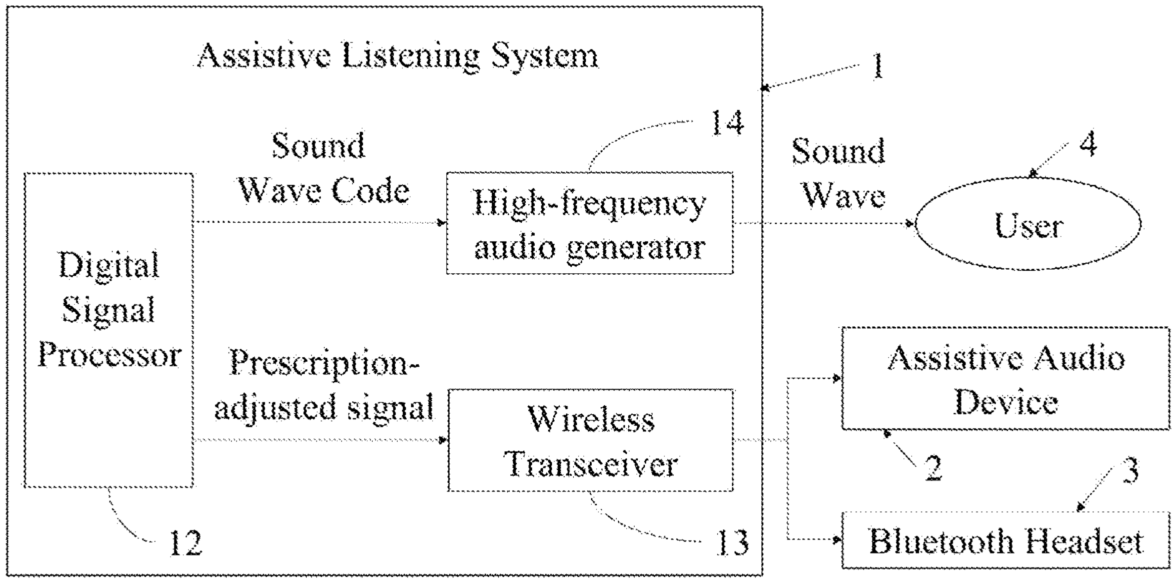
FIG. 4 is a block diagram of the assistive listening system according to the invention.

With reference to FIG. 4, in some embodiments, the high-frequency audio generator 14 is in signal connection with the digital signal processor 12, and the digital signal processor 12 generates a sound wave code to the high audio generator 14 according to the prescription-adjusted signal so that the high-frequency audio generator 14 produces a sound wave according to the sound wave code, wherein the generated prescription-adjusted signal will be carried out by frequency offset modulation, and the concept is to use two or more different frequencies to represent digital information. For example, there are two frequencies, $f_1$=21000 Hz as 0 and $f_2$ 2=22000 Hz as 1, and for the data to be transmitted, such as the volume, the data of each frequency gain will be encoded into data composed of 01; assuming that the last generated data is 01100, then the combined frequency of $f_1f_2f_2f_1f_1$ will be generated and the frequency signal sound wave thereof will be sent through the high-frequency audio generator 14, wherein the high-frequency audio generator 14 may be a loudspeaker, stereo, earphone, etc. Thus, the user 4 who wears the assistive audio device 2 or the Bluetooth headset 3 may decode the data back to 01100 and set it after receiving the sound wave, while other users who do not wear the aforementioned device will not affect others because the transmission frequency of the prescription-adjusted signal is not within the audible range of human ears.

In addition, when entering transportation centers, hospitals, shopping malls, and other spaces, it is also difficult to hear the public information or warning sounds of the broadcast due to the background noise of the environment; for example, in the area near the airport where the plane takes off and lands, the amplitude of the background noise of the environment varies greatly, then the gain and volume of the user wearing the above-mentioned device may be adjusted in time so that the content of the broadcasted public message or warning sound may be heard more clearly through the sensing signal detected in real-time by the sound sensor 11 of the assistive listening system 1 of the invention, through the real-time prescription-adjusted signal and the corresponding sound wave code generated by the digital signal processor 12, and through the sound waves generated by the high-frequency audio generator 14.

Figure 5:
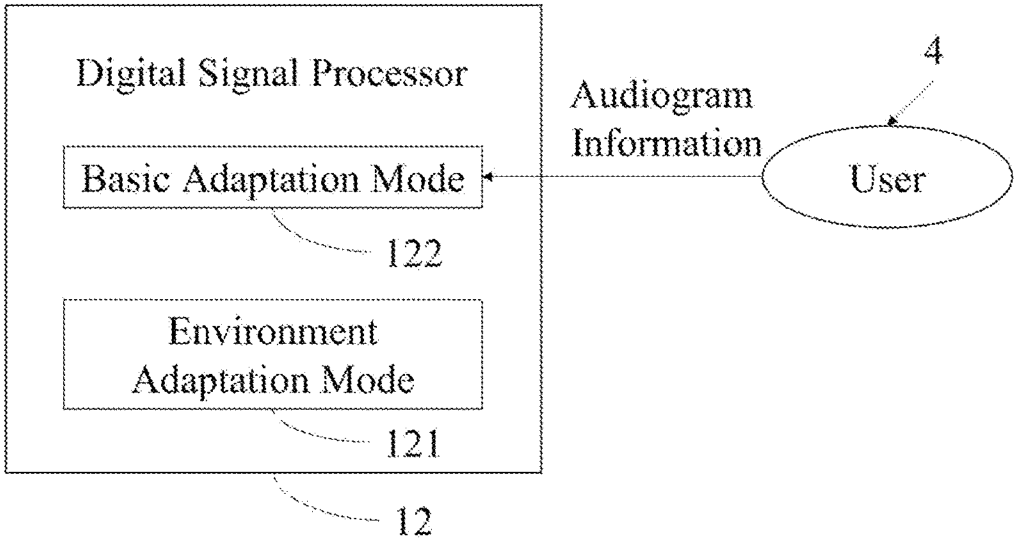
FIG. 5 is a diagram of a digital signal processor according to the invention.

With reference to FIG. 5, in some embodiments, the digital signal processor 12 is configured with an environment adaptation mode 121, or is configured with the environment adaptation mode 121 and a basic adaptation mode 122 simultaneously. When in the basic adaptation mode 122, the digital signal processor 12 may receive the audiogram information input by the user, and generate the prescription-adjusted signal based on it as a basic prescription-adjusted signal and transmit the basic prescription-adjusted signal to the audio output device. Optionally, when the digital signal processor 12 is in the basic adaptation mode 122, the digital signal processor 12 has been previously stored with the basic prescription-adjusted signal, so the basic prescription-adjusted signal may be directly transmitted to the audio output device.

The environment adaptation mode 121 uses the sound sensor 11 to detect the background noise of the environment to generate the sensing signal, and the digital signal processor 12 generates the prescription-adjusted signal in the environment adaptation mode 121 according to the sensing signal, which is an environment adaptation prescription-adjusted signal. Further, when the user 4 enters a different public environment, the digital signal processor 12 immediately transmits the environment adaptation mode 121 to the audio output device; when the user 4 leaves the public environment, since the sensing signals generated at different time points are different, the digital signal processor 12 may judge the change of the noise of the environment (for example, from noisy to quiet) according to these sensing signals, and switch between the environment adaptation mode and the basic adaptation mode; for example, the basic adaptation mode 122 is transmitted to the audio output device.

The environment adaptation mode 121 is mainly generated according to different public environments; the environment adaptation mode 121 may be different according to the public environment where the sound sensor 11 is located, such as living room, car, restaurant, transportation center, hospital, shopping mall, etc., so that the environment adaptation prescription-adjusted signal of the environment adaptation mode 121 will be generated to ensure optimal sound quality in various public environments and enjoy a better listening experience.

Figure 6:
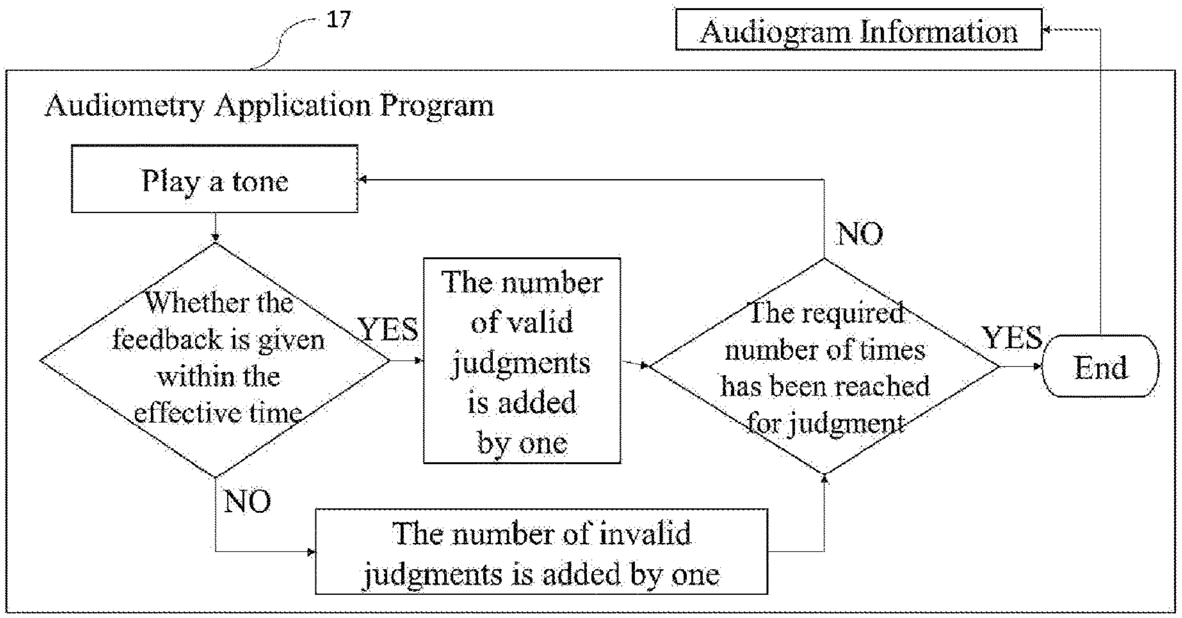
FIG. 6 is a flow chart of the assistive listening system according to the invention.

With reference to FIG. 6, the flow chart shows the process of general hearing test, and then generates audiogram information and the optimal configuration generated by wearing the audio output device; the optimal configuration is that the digital signal processor 12 generates a second prescription-adjusted signal to adjust the corresponding scene configuration.

Regarding the audiogram information, it is further explained that the audiogram is a visual tool that simulates the damage that the human ear may suffer when listening to audio materials, and may calculate the degree of attenuation that sounds of different frequencies may suffer during transmission, which is also an important reference information for hearing aids; therefore, the audiogram information is needed for customized adjustments, so as to make more accurate adjustments to the hearing features of the user 4. The user 4 may go to a medical institution to create the audiogram information, or can create the audiogram information through an audiometry application program 17 in the assistive listening system 1; when the audiometry application program 17 is used for audiometry, the audiometry application program 17 will generate the tone of the audiometry frequency and the target decibel (dB) to ensure that different mobile devices will not cause differences in the frequency of the tone due to the difference in the decoding of the audio decoder; then, a tone is played while waiting for the user 4 to give feedback by clicking the button displayed by the audiometry application 17, and the audiometry application program 17 will judge whether the user 4 gives feedback within the valid time, wherein if the feedback is given within the effective time, then the number of valid judgments is added by one, and if not, the number of invalid judgments is added by one and the audiometry application program 17 may judge whether the required number of times has been reached for judgment; if the required number of times has been reached, the test is ended.

Also, if the gain of the audio output device is too large, the sound will be too loud and cause discomfort; if the gain is too small, it cannot meet the needs of the user 4. Therefore, in order to be closer to the listening experience configuration for the user, the most suitable configuration will be obtained according to the gain parameter setting composed of the audiogram information, age, gender, and other factors of the user 4.

In addition, the artificial intelligence model 51 of the cloud server 5 may also generate the prescription-reinforced parameters to the digital signal processor 12 based on the gain parameters. Moreover, the digital signal processor 12 may adjust the basic adaptation mode 122 according to the satisfaction feedback of the user 4, so that the basic adaptation mode 122 may better meet the hearing needs and habits of the user 4. If there is no gain parameter at all, the digital signal processor 12 will use a prescription software of the hearing aid to set the basic adaptation mode 122.

In some embodiments, through the environment situation broadcaster 15 and the audio broadcaster 16, the invention may also receive commercial or non-commercial broadcast public information provided by the public environment when the user 4 wears the audio output device and enters the public environment, so that the user 4 may clearly hear the broadcast in the public environment, creating a hearing-free public environment. In terms of commercial use, commercial sellers may use the environment situation broadcaster 15 and the audio broadcaster 16 to provide real-time commercial broadcast information when the user 4 is in the mall; the commercial sellers may upload the scheduled audio broadcast schedule to the digital signal processor 12 or the cloud server 5, and then broadcast it through the environment situation broadcaster 15, or may use a microphone (not shown) in signal connection with the audio broadcaster 16 to receive and broadcast in real time. In large closed environments such as tour vehicles, banquet halls, and stadiums, the assistive listening system 1 may be used to help the user 4 who is far away from the sound source (such as a singer or a speaker), and the function of "broadcast audio" in Low Energy is mainly used. The function may allow an unlimited number of assistive listening devices or the Bluetooth headset to broadcast audio streams through a single audio device, so that the assistive listening device or the Bluetooth headset may also enjoy clear broadcast sound quality. In more detail, the service staff of the shopping mall may receive the instruction message through the audio broadcaster 16 through the high-frequency audio generator 14 in the shopping mall.

In summary, the effect of the invention is that when the background noise of the environment changes, the sound sensor 11 may generate the sensing signal in real time, according to which the digital signal processor 12 of the assistive listening system 1 is capable of generating the prescription-adjusted signal and transmitting it to the audio output device of a user 4; when the user 4 enters different public environments, the digital signal processor 12 immediately transmits the environment adaptation mode 121 to the audio output device, while the audio output device may automatically remove the adjustments provided by the assistive listening system when the user 4 leaves the public environments. Therefore, the user 4 may enjoy optimized sound quality and better listening experience without manually adjusting the audio output device, thereby achieving the objective of the invention.

However, the above are only preferred embodiments of the invention, and are not used to limit the scope of the present invention. That is, all equivalent changes and modifications made according to the claims and description of the invention are covered by the patent of the invention.

What is claimed is:

1. An assistive listening system, which is designed to provide a prescription-adjusted signal to an audio output device for hearing impairment compensation, comprises:

a sound sensor used to detect ambient background noise to generate a sensing signal;

a digital signal processor in signal connection with the sound sensor to receive the sensing signal and generate a prescription-adjusted signal based on the sensing signal; and a wireless transceiver in signal connection with the digital signal processor, the wireless transceiver used to transmit the prescription-adjusted signal to the audio output device.

2. The assistive listening system according to claim 1, wherein the wireless transceiver is further in signal connection with the sound sensor and a cloud server, the cloud server is configured with an artificial intelligence model, and the wireless transceiver receives and transmits the sensing signal to the cloud server and then receives prescription-reinforced parameters generated through computation by the artificial intelligence model based on the sensing signal through.

3. The assistive listening system according to claim 1, wherein the wireless transceiver comprises a Bluetooth component, a Wi-Fi component, or a Long Term Evolution (LTE) component.

4. The assistive listening system according to claim 1, wherein the digital signal processor is configured with an environment adaptation mode, and when the audio output device is in the environment adaption mode, the prescription-adjusted signal generated by the digital signal processor is an environment adaptation prescription-adjusted signal.

5. The assistive listening system according to claim 4, wherein the digital signal processor is further configured with a basic adaptation mode, and when the audio output device is in the basic adaptation mode, the prescription-adjusted signal generated by the digital signal processor is a basic adaptation prescription-adjusted signal; the basic prescription-adjusted signal is generated by the digital signal processor according to an audiogram information, and the wireless transceiver is further used to transmit the basic prescription-adjusted signal to the audio output device.

6. The assistive listening system according to claim 5, wherein the digital signal processor further switches between the environment adaptation mode and the basic adaptation mode based on the sensing signal generated according to background noise in different environments.

7. The assistive listening system according to claim 6, further comprising a high-frequency audio generator connected with the digital signal processor, wherein the digital signal processor generates a sound wave code to the high-frequency audio generator according to the environment adaptation prescription-adjusted signal or the basic prescription-adjusted signal, and the high-frequency audio generator generates a sound wave according to the sound wave code.

8. The assistive listening system according to claim 1, further comprising a high-frequency audio generator connected with the digital signal processor, wherein the digital signal processor generates a sound wave code to the high-frequency audio generator according to the prescription-adjusted signal, and the high-frequency audio generator generates the sound wave according to the sound wave code.

9. The assistive listening system according to claim 1, further comprising an environment situation broadcaster and an audio broadcaster connected with the digital signal processor.

* * * * *